United States Patent [19]
Porter

[11] Patent Number: 5,963,618
[45] Date of Patent: Oct. 5, 1999

[54] VOICE PROCESSING SYSTEM

[75] Inventor: Lawrence Leon Porter, Hampshire, United Kingdom

[73] Assignee: International Business Machines Corp., Armonk, N.Y.

[21] Appl. No.: 08/844,712

[22] Filed: Apr. 18, 1997

[30] Foreign Application Priority Data

Apr. 26, 1996 [GB] United Kingdom ................. 96086640

[51] Int. Cl.⁶ .................................................. H04M 1/64
[52] U.S. Cl. ..................................... 379/88.17; 379/88.18
[58] Field of Search ............................ 379/88.13, 88.14, 379/88.17, 88.18, 201, 207, 210, 211, 212; 395/200.36, 200.01

[56] References Cited

U.S. PATENT DOCUMENTS

| | | | |
|---|---|---|---|
| 4,612,416 | 9/1986 | Emerson et al. ............. | 379/88.18 |
| 4,790,003 | 12/1988 | Kepley et al. ............. | 379/142 |
| 4,837,798 | 6/1989 | Cohen et al. ............. | 379/88.14 |
| 5,029,199 | 7/1991 | Jones et al. ............. | 379/89 |
| 5,274,696 | 12/1993 | Perelman ............. | 379/207 |
| 5,278,897 | 1/1994 | Mowery et al. ............. | 379/212 |
| 5,287,498 | 2/1994 | Perelman et al. ............. | 395/600 |
| 5,301,226 | 4/1994 | Olson et al. ............. | 379/67 |
| 5,333,266 | 7/1994 | Boaz et al. ............. | 395/200.36 |
| 5,394,460 | 2/1995 | Olson et al. ............. | 379/212 |
| 5,406,557 | 4/1995 | Baudoin ............. | 370/85.13 |
| 5,479,411 | 12/1995 | Klein ............. | 379/88.13 |
| 5,493,607 | 2/1996 | Arumainayagam et al. ............. | 379/88 |
| 5,530,739 | 6/1996 | Okada et al. ............. | 379/207 |
| 5,557,659 | 9/1996 | Hyde-Thompson ............. | 379/233 |
| 5,572,578 | 11/1996 | Lin et al. ............. | 379/207 |
| 5,581,757 | 12/1996 | Maxey ............. | 395/200.01 |
| 5,608,783 | 3/1997 | Ichnowski et al. ............. | 379/88.18 |
| 5,608,786 | 3/1997 | Gordon ............. | 358/402 |
| 5,631,948 | 5/1997 | Bartholomew et al. ............. | 379/230 |
| 5,647,002 | 7/1997 | Brunson ............. | 379/201 |
| 5,657,376 | 8/1997 | Espeut et al. ............. | 379/211 |
| 5,661,782 | 8/1997 | Bartholomew et al. ............. | 379/230 |
| 5,675,631 | 10/1997 | Kaminsky et al. ............. | 379/196 |
| 5,689,550 | 11/1997 | Garson et al. ............. | 348/15 |
| 5,737,395 | 4/1998 | Irribarren ............. | 395/200.02 |

FOREIGN PATENT DOCUMENTS

| | | |
|---|---|---|
| 504880 | 3/1992 | European Pat. Off. . |
| 662762 | 12/1994 | European Pat. Off. . |
| WO95/15046 | 6/1995 | WIPO . |

*Primary Examiner*—Daniel S. Hunter
*Attorney, Agent, or Firm*—Jerry W. Herndon

[57] ABSTRACT

A method of providing a voice mail service is disclosed using a voice processing system having a communications link to one or more voice mail systems. A voice message for a subscriber to said one or more voice mail systems is received at said voice processing system, which prompts a determination as to the voice mail system on which said subscriber has a voice mailbox. The voice message is the transmitted to the voice mail system on which said subscriber has a voice mailbox. In the preferred embodiment, the communications link forms part of the Internet, and received messages are processed independently by two separate voice processing systems to provide redundancy.

38 Claims, 2 Drawing Sheets

VOICE PROCESSING SYSTEM

FIELD OF THE INVENTION

The present invention relates to voice processing systems, and in particular to a voice mail system having a communications link to one or more other voice mail systems.

BACKGROUND OF THE INVENTION

Voice mail systems (also termed voice messaging systems) attach to the telephone network, often via a PBX, and are used to receive incoming calls when the intended recipient or subscriber is absent or otherwise engaged. Typically a greeting is played to the caller, who is then asked to leave a message for storage in the voice mailbox of that subscriber. Most systems allow the greeting to be personalised for each subscriber, and may include the subscriber speaking their own name. The intended recipient of the call can then dial up the voice mail system to listen to the stored messages from their mailbox at some future time. Such voice mail systems also usually allow messages to be sent or forwarded from one subscriber of the voice mail system to another.

A voice mail system is generally implemented either on special purpose computer hardware, or else on a standard computer workstation equipped with a suitable telephony interface. Such voice mail systems are well-known; one example is the DirectTalkMail system, available from IBM Corporation, which operates in conjunction with the DirectTalk/6000 voice processing system (also available from IBM).

Also very well-known are computer-implemented electronic mail (e-mail) systems, such as Lotus Notes, available from Lotus Corporation, whereby computer files, primarily textual, may be sent from one computer user to another. The recent development of the Internet has led to a great expansion in the use of such electronic mail systems. Typically computer e-mail systems have been separate from voice mail systems, the former usually being accessed via a desktop computer, the latter via a telephone. but in recent years unified mail systems have been developed which can handle both textual and voice messages (such systems are sometimes referred to as multimedia systems). For example, Lotus Notes includes Phone Notes whereby voice information entered via a telephone may be captured into a Note. Essentially Phone Notes is a development environment; it does not provide a full-scale multi-user voice messaging system.

W087/07801 discloses an integrated system which combines a voice mail system and a computer e-mail system. In this integrated system, the user may designate one mail system (ie voice or computer) as the primary recipient for all messages, with notifications of both voice and e-mail messages being received at this system. This approach is developed in U.S. Pat. No. 5,333,266, which teaches an integrated messaging system based on multiple servers for different media types. Commercially available products which provide integrated or unified messaging include CallXpress3 DeskTop for Windows, available from Applied Voice Technology Incorporated, and VMX DeskTop for Windows, available from VMX Incorporated (now part of Octel Communications Corporation). Another multimedia messaging system is Intuity from AT&T (see Computer Reseller News, Nov. 28, 1994, p12).

The recent development of the Internet has also led to its use for telephony, as described for example in "Dial 1-800-Internet" in Byte Magazine, February 1996, p83–86, and in "Nattering On", in New Scientist, Mar. 2, 1996, p38–40. Such Internet telephones sometimes provide a voice mail or answerphone type function. Patent application GB 9604667.7 (UK9-96-015), by IBM Corporation, describes the provision of a full voice mail service for such Internet telephones.

It is known to have multiple voice mail systems connected together. One reason for doing this is to provide extra capacity, as well as a redundancy capability, to provide back-up should one of the voice mail systems be unavailable. For example, U.S. Pat. No. 5,029,199 discloses an architecture with multiple voice mail units, connected via a physical bus providing voice and data communications over an Ethernet. Each subscriber is assigned a "home" voice mail unit. Incoming calls are notified to a control unit, along with information including the called number. The control unit uses this information to determine the home voice mail unit for the call, which is where the greeting for that subscriber is stored. The control unit then instructs a switching means to route the call through to the home unit. However, if the home unit is unavailable for some reason, for example it is already handling its maximum number of calls, then the control unit routes an incoming call to a different voice mail unit (a "remote" unit), along with an indication of which is the normal home unit for this subscriber. The remote unit can then try to retrieve the greeting for that subscriber from the home unit. After the remote unit completes the call, it can signal to the control unit that it has a message for that subscriber, which is not stored on the home unit for that subscriber. Somewhat similar systems are also disclosed in U.S. Pat. No. 5,301,226 and U.S. Pat. No. 5,394,460.

Another reason for linking voice mail systems together is when a firm for example has multiple locations, each with its own voice mail system. It then may be desired to allow subscribers at one location to send or forward voice mail messages from one location to another location. Two examples of this are U.S. Pat. No. 5,287,498 and U.S. Pat. No. 5,493,607, which provide a logical addressing scheme to be used with such multiple voice mail systems. Another example is WO 95/15046 which discusses the problem of how to provide a simple personalised greeting (in this case a subscriber speaking their own name), when a voice mail message is being sent to a remote voice mail system. One possibility mentioned is for each system to maintain a directory including information and a voice response for each user on each remote system in the network, but this is considered unattractive because of the storage and system administration requirements. The proposed solution is that when a message is sent to a subscriber on a remote voice mail system, this system returns the spoken name for that subscriber which is then stored locally, and so is available next time a message is to be sent to that caller. This is similar in concept to the familiar caching of data in a computer memory system, exploiting the observation that generally the subscribers most likely to be called in the future are those who have been called in the past. It should be noted that in U.S. Pat. No. 5,28,7498, U.S. Pat. No. 5,493,607 and WO 95/15046 it is the public telephone network which is primarily used for the transmission of voice messages between different voice mail systems.

EP-A-504880 describes a mail centre management system (eg for FAX or speech messages), having first and second mail devices connected by a network over which mail can be transferred between the devices.

Nevertheless, despite the above, there are still many situations in which the functionality of present day voice mail systems remains wanting. For example, to leave a voice mail message in a voice mailbox which is located on a voice mail system in a foreign country generally requires an international call. Some voice mail systems may allow international messaging between voice mail systems in different countries, but this is not available to callers who are not subscribers to that voice mail network. Moreover, many international corporations may have voice mail systems from different suppliers in different countries, and these are often incompatible with one another (eg they use different addressing schemes, or different voice compression formats), thereby preventing cross-border voice messaging.

Another difficulty is to provide 100% availability of voice mail systems to callers. The usual solution is to purchase a complex, expensive voice mail system with redundancy built in, but even these systems can be stretched if supplying the millions of voice mailboxes which may be required if the voice mail system is to be operated as a public voice mail facility by a telephone network company. Furthermore, such redundancy requirements may tie the operator to one vendor of voice mail equipment, and this may not always be desirable.

Another example of the limitations of present day systems is for example if a large multinational corporation wishes to provide a Freecall (800) number in multiple countries to allow employees and customers to leave voice messages for any corporation employees, no matter in which country the employees are located. However, if the corporation has different voice mail systems in different countries, and these are incompatible with one another, then the prior art provides no method for implementing such a service.

It is an object of the present invention to provide systems which address the limitations and disadvantages described above.

SUMMARY OF THE INVENTION

Accordingly, the invention provides a voice processing system, having a communications link to one or more voice mail systems, including:
  means for receiving a voice message for a subscriber to said one or more voice mail systems;
  means for determining the voice mail system on which said subscriber has a voice mailbox;
  means, responsive to said determination, for transmitting the voice message to the voice mail system on which said subscriber has a voice mailbox.

In the preferred embodiment, the voice processing system is connected to at least two different voice mail systems, and must determine on which of them the mailbox for the called subscriber resides. This is achieved by accessing a directory listing the subscribers who have a voice mailbox on said one or more voice mail systems. Said directory includes for each subscriber an identification of their voice mailbox, the voice mail system on which said voice mailbox is located, and a personalised recording, typically the name of said subscriber, spoken by said subscriber, for at least some subscribers to said one or more voice mail systems. The voice processing system includes means for playing said recording to the sender of said voice message.

This allows a call to be received, and the directory entry for the called subscriber to be retrieved. The personalised greeting for that subscriber can then be played to the caller, who can be invited to leave a message. Assuming that they do so, this message is then recorded on the voice processing system, before transmission of the voice message to the voice mail system indicated in the directory entry as corresponding to the called subscriber.

In the preferred embodiment, said directory includes for at least some subscribers the electronic mail address of the subscriber, and said voice processing system further includes means for transmitting the voice message to said electronic mail address. Said voice message may be transmitted to said electronic mail address as an audio file in Internet SMTP/MIME format. A subscriber may optionally select whether received voice messages are transmitted to his/her voice mailbox, or to his/her electronic mail address, or to both, providing the subscriber with maximum possible access to their voice messages.

Said directory may be included on the same machine as said voice processing system, or on a separate machine having a communications link to the voice processing system. The voice processing system may also contain subscriber mailboxes (ie the voice processing system may double as a voice mail system, as in for example the DirectTalk/6000 and DirectTalkMail combination available from IBM). In this situation said voice processing system is responsive to a determination that the subscriber mailbox for the received message is located on said voice processing system for storing said voice message therein. Alternatively however, there may not be any subscriber mailboxes are stored on said voice processing system itself.

In the preferred embodiment, said communications link is either over the Internet, or else over an intranet modelled in architecture on the Internet. Such a multi-node network provides robust message delivery, so that if a destination voice mail system is unavailable, the voice message being transmitted there can be buffered within the network until the voice message becomes available again. Preferably said voice message is transmitted to said voice mail system in a digital format, conforming to the Voice Profile for Internet Mail (VPIM).

The invention further provides a voice mail system, having a communications link to one or more other voice mail systems, including:
  means for receiving a voice message for a subscriber to said voice mail system or to said one or more other voice mail systems;
  means for determining on which voice mail system said subscriber has a voice mailbox;
  means, responsive to a determination that said subscriber has a voice mailbox on said voice mail system, for storing said voice message therein; and
  means, responsive to a determination that said party has a voice mailbox on one of said one or more other voice mail systems, for transmitting said voice message to said one of said one or more other voice mail systems.

The invention further provides a method of providing a voice mail service using a voice processing system having a communications link to one or more voice mail systems, said method including the steps of:
  receiving a voice message for a subscriber to said one or more voice mail systems at said voice processing system;
  determining the voice mail system on which said subscriber has a voice mailbox;
  transmitting the voice message to the voice mail system on which said subscriber has a voice mailbox.

It will be appreciated that the determination of the voice mail system on which said subscriber has a voice mailbox may be made as soon as the call for said subscriber is received by the voice processing system (ie before the voice message itself is actually received). Indeed, this will normally be the case, if the caller is to hear a personalised greeting from the subscriber, or alternatively perhaps the subscriber's name spoken by a text to speech system.

In the preferred embodiment there are at least two voice processing systems, and these act as front ends to multiple voice mail systems (nb again, the voice processing systems themselves may double as voice mail systems). Each voice processing system has access to a directory identifying on which voice mail system the voice mailbox for the called subscriber can be located. There are at least two copies of the directory, which in conjunction with the two or more voice processing systems provides redundancy and hence ensures high availability. Typically, a copy of the directory will be provided for each voice processing system. However, in a closely-coupled environment (usually at a single geographical location), with more than two voice processing systems, there may for example only be two directories, networked to or into the voice processing systems.

The existence of multiple copies of the directory requires that update information is propagated to all copies of the directory. Typically such updates are generated at the voice mail systems themselves, as changes are made for example to the subscribers on such voice mail systems. These changes are then forwarded from the voice mail system to all copies of the directories. In a closely-coupled environment, such forwarding may be done directly, whilst in a geographically distributed configuration, it may be desirable to have all updates applied first to a central database which is then replicated to each voice processing system directory. Note that although in this latter arrangement the central database might be regarded as a single point of failure, if this database is unavailable, it does not prevent operation of the system, but rather only renders recent changes in the directory unavailable.

Where there are at least two voice processing systems, which are typically be accessed via the same telephone number (in order to provide redundancy and extra capacity), said voice message for a subscriber to said one or more voice mail systems may be received at either (any) of said two or more voice processing systems, and said at least two voice processing systems may perform said determining and transmitting steps independently of one another to provide a redundancy capability. Calls may be routed (eg by a PBX, central office, or whatever device the voice processing systems are attached to), to a selected one of the at least two voice processing systems based for example on which one system is currently handling fewest calls. Another possibility is for calls for a particular subscriber to be preferentially received by one of said at least two voice processing systems; for example, where there are subscriber mailboxes on the voice processing systems themselves, then calls for a particular subscriber having a mailbox on one of said at least two voice processing systems may be preferentially received by the voice processing system on which the mailbox is located.

An important aspect of the invention is that said voice mail message may potentially be received from a caller who is not a subscriber to said one or more voice mail systems. Thus whilst prior art systems allow subscribers to forward or transmit messages from one voice mail system to another, the present invention allows external callers (who may not have a voice mailbox on any voice mail system) to be presented with the appearance of a unified voice message system, even though multiple voice mail systems may in fact be involved. This may be the case even when said voice processing system is located in a different country from at least one of said at least one or more voice mail systems, or perhaps where there are multiple voice mail systems which themselves are widely dispersed geographically.

The invention further provides a system for providing voice mail service comprising at least two voice processing systems, each having associated therewith a database containing a directory of subscribers to said voice mail service, and at least one voice mail system for storing voice mailboxes for subscribers to said voice mail service, said at least two voice processing systems and said at least one voice mail system being connected together by a communications link, including:

means for routing an incoming call for a subscriber to a selected one of said voice processing systems;

means at said selected voice processing system for receiving a voice message for a subscriber to said voice mail service;

means at said selected voice processing system for using said associated directory to determine the voice mail system on which said subscriber has a voice mailbox;

means, responsive to said determination, for transmitting the voice message over said communications link to the voice mail system on which said subscriber has a voice mailbox.

In the preferred embodiment, the at least two voice processing systems are attached to the public telephone network for the receipt of voice messages, typically by a digital trunk connection to provide sufficient bandwidth. It will be appreciated of course that this connection may be behind a PBX.

Preferably the voice mailboxes in at least one of said at least one voice mail systems may be accessed over the Internet by a WorldWideWeb browser.

BRIEF DESCRIPTION OF THE DRAWINGS

Preferred embodiments of the invention will now be described in detail, with reference to the following drawings.

DETAILED DESCRIPTION OF PREFERRED EMBODIMENTS

Figure 1:
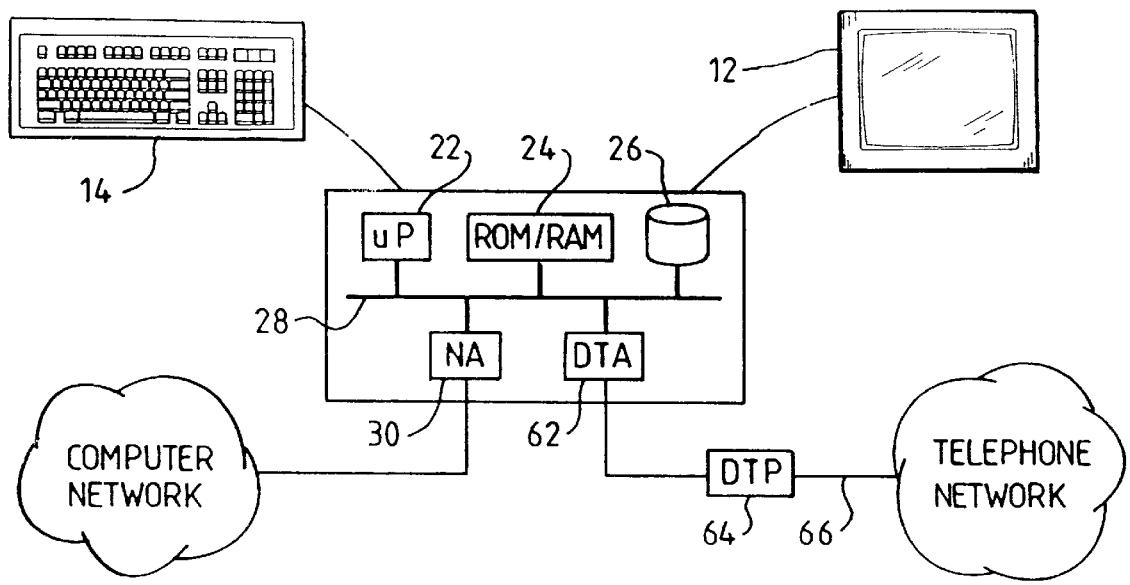
FIG. 1 is a simplified diagram of a voice mail system.

FIG. 1 is a simplified diagram of a voice mail system based on a conventional computer workstation comprising system unit 20, display screen 12, and keyboard 14. The system unit includes a microprocessor 22, ROM/RAM 24, and disk storage 26, connected together via bus 28. In order to operate as a voice mail unit, the computer workstation is connected to telephone line 66 via a digital trunk processor 64 and a digital trunk adapter card 62. The voice mail system also includes a network adapter card 30 to connect the voice mail system to a computer network (eg a LAN). The voice mail system may also include other known components, such as an audio capture/playback card, a CD-ROM and mouse (not shown).

The voice mail system illustrated in FIG. 1 is based on the DirectTalk/6000 voice processing system (or voice response unit), available from IBM Corporation. The hardware components of this system are an RISC System/6000 computer workstation, plus the digital trunk processor and digital trunk adapter. The DirectTalk/6000 system connects to the telephone network through a T1 or E1 digital trunk line 66 (and via a PBX in most installations). The digital trunk processor is used to demultiplex incoming signals and multiplex outgoing signals on the trunk line, and perform log-linear conversion as appropriate. The digital trunk processor is also used to perform compression/decompression. The digital trunk adapter effectively acts as an interface between the workstation itself and the digital trunk processor. Further details about the DirectTalk/6000 voice processing system can be found in the manual "IBM AIX DirectTalk/6000, General Information and Planning" (publication number GC22-1720-00) and the other manuals referenced therein.

Figure 2:
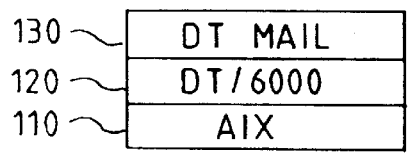
FIG. 2 is a simplified diagram of the main software components of the voice mail system of FIG. 1.

FIG. 2 is a simple block diagram of the main software components running on the voice mail system of FIG. 1. Running on the RISC System/6000 is first of all the operating system for the workstation, which in the present case is AIX 110, and then the DirectTalk/6000 software 120 itself. This can be used for example to play prompts or other information to callers, to receive DTMF inputs from them, and also to record their voice input. Also on the RISC System/6000 workstation, effectively running as an application on top of DirectTalk/6000, is DirectTalkMail 130, which provides standard voice messaging capabilities.

The AIX operating system provides many communications facilities, which allow application programs such as DirectTalk/6000 and DirectTalkMail to exchange computer messages with remote machines. Such communications facilities are well-known in the art, and are described in more detail in the manuals "AIX V4.1 System User's Guide: Communication and Network" (publication number SC23-2545-01) and "AIX V4.1 Communications Programming Concepts" (publication SC23-2610-01).

It will be appreciated that voice mail systems such as that illustrated in FIGS. 1 and 2 are well-known, and that many variations on the system illustrated are also well-known. For example, the telephone line 66 may be analog, and/or or the digital trunk processer may be omitted, and its functions performed, where appropriate by a suitable telephony adapter card. The precise hardware configuration employed in the voice mail system is not relevant to an understanding of the present invention, and so will not be discussed further.

The DirectTalkMail voice messaging system itself can be considered as a form of database system, based on mailboxes. Thus each user has a mailbox, which has associated with it all the information for that user, eg their extension number, their password, the number of new messages that they have, their current greeting, and so on. The mailbox also logically contains the digitised stored messages for that user (although physically the audio recording may be stored in a different location from the other information). Each mailbox has a unique identifier, such as a number or name, for example, each mailbox can be allocated the extension number of the user associated with that mailbox. The DirectTalkMail voice messaging system also contains routines to allow callers to telephone messages into the database and users to extract messages from the database for listening over the telephone, as well as other functions such as forwarding messages. The operation of a voice mail system in such a manner is well-known and so will not be described further, although additional information about operating the DirectTalkMail voice mail system can be found in the manual "IBM AIX DirectTalkMail Administration" (publication number SC33-1733).

Figure 3:
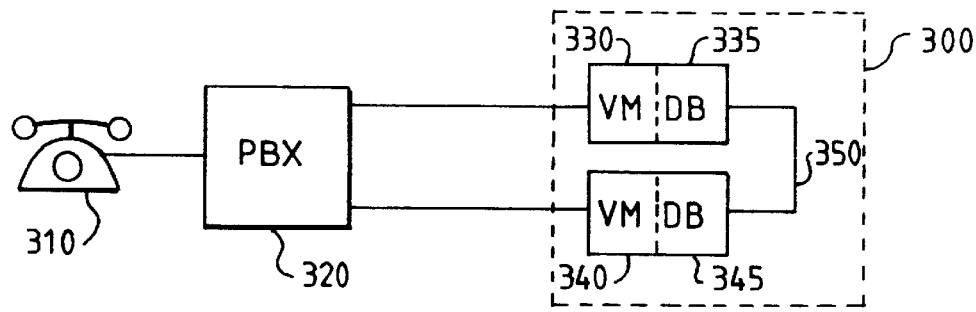
FIG. 3 is a schematic diagram of a first embodiment of the invention.

FIG. 3 illustrates a simple first embodiment of the invention in which an overall system 300 comprises first and second voice mail systems 330, 340 which are attached to a PBX 320. The two voice mail systems are connected to each other by communications link 350, which may be a local area network (LAN). In the preferred embodiment, the two voice mail system exchange messages with one another using TCP/IP protocol.

Each voice mail system has an associated database 335, 345. These are essentially identical, with each database containing a directory listing the subscribers to system 300. This is typically the people who have extensions connected to PBX 320 (nb the extensions themselves are not shown in FIG. 3). For each person listed, the database contains the mailbox number for that person, and an indication of the host voice mail machine on which the mail box is located. In the preferred embodiment, the mailbox number corresponds to the actual telephone number of a particular person, and the indication of the voice mail machine comprises the IP address for that machine, although any other suitable naming and addressing scheme could be used. In addition, the database also contains the personal greeting for each subscriber, for example a recording of a subscriber speaking their own name, plus a recording of information concerning their current location, and likely call-back time.

The operation of the system of FIG. 3 will now be described. When a call is made to an extension on the PBX by caller 310, who may be an external or internal caller, then the PBX determines in conventional fashion that the call should be forwarded to voice mail because the called party is not currently available. The call is then forwarded to one of the voice mails systems 330, 340. There are various methods according to which the PBX can make this selection. For example, the call may be directed to the voice mail system for which fewest telephone lines are currently active, or perhaps calls for a certain range of extensions are preferentially forwarded to a particular voice mail system. Such routing strategies are well-known in the art. However, it is important to appreciate that if a call cannot be accepted by the preferred voice mail system, for example because all its lines are busy, then the call will be directed to the other voice mail system. This ensures that the overall system has extremely high availability from an external perspective, since incoming messages can always be accepted, even if only one of the voice mail systems 330, 340 is currently operational.

Figure 4:
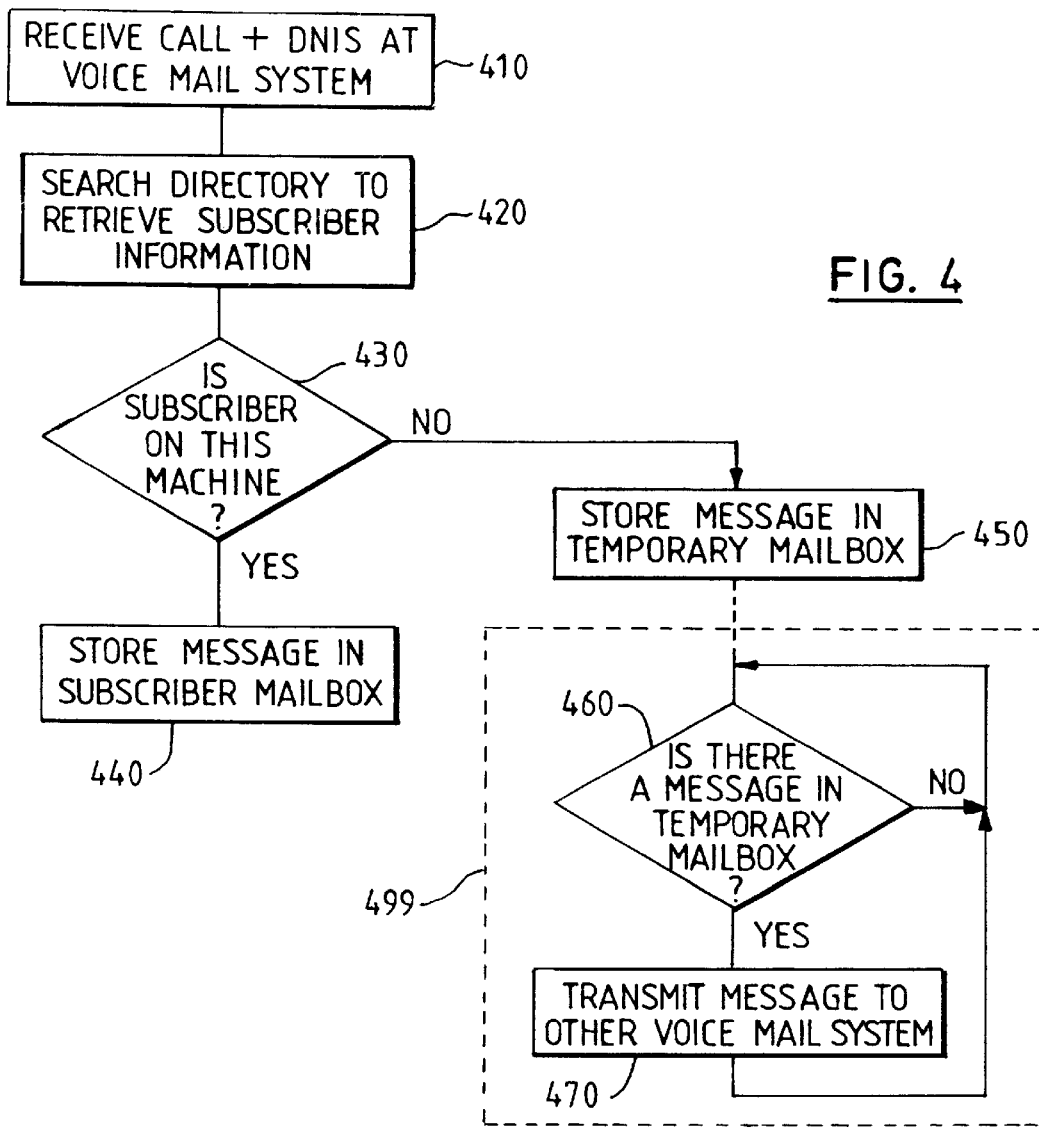
FIG. 4 is a flowchart illustrating the operation of the embodiment of FIG. 3.

Thus the call is routed to and received at one of the voice mail systems, depicted as step 410 in FIG. 4, which is a flow-chart representing the call handling of system 300 in FIG. 3. The call is handled at the voice mail system by a simple DirectTalkMail application. In the preferred embodiment, the voice mail system also receives from the PBX the DNIS (dialled number identifcation service) information, which specifies the extension for which the call was originally destined. However, if this information is not automatically available, then a small DirectTalk application is invoked to prompt the caller to enter the dialled extension number using their DTMF keypad.

Once the extension of the intended call recipient has been identified, the DirectTalkMail application accesses the local directory (335 or 345 as appropriate) to locate the specified extension (step 420). This allows relevant details for that subscriber (ie the intended call recipient) to be retrieved, in particular the mailbox number, host machine, and also personal greeting. The identity of the host machine is then compared with the identity of the voice mail system which is handling the call (step 430). If there is a match, then the mailbox for that subscriber is located on that voice mail machine, and so the call can be processed and in normal fashion (step 440). Typically this involves playing the subscriber's greeting to the caller, and then recording a message for the subscriber from the caller. Note that if the PBX is instructed to preferentially direct calls for particular extensions to the voice mail system on which the voice mailbox associated with that extension is located, then the majority of calls will be processed in this conventional manner.

However, if the identity of the host machine is different from that of the current voice mail system handling the call (ie presumably it corresponds to the other voice mail machine in system 300), then again the call is processed in normal fashion, but any message is stored in a special temporary mailbox (step 450). In the preferred embodiment, this temporary mailbox is simply a normal mailbox which has not been assigned to any other subscriber. Note that in some systems, more than one temporary mailbox may be used to ensure sufficient storage capacity for voice messages destined for the other voice mail system.

The message stored in the temporary mailbox is processed by a separate DirectTalk application, which performs the operations enclosed within dotted box 499 in FIG. 4. This application utilises the custom server interface of the DirectTalk system, which permits user programs in the C programming language access to the voice database (including mailbox messages and associated information). Further details about the custom server interface in the DirectTalk system can be found in the publication "IBM AIX DirectTalk/6000 Voice Application Development" (reference number SC33-1722-00).

Essentially this DirectTalk application operates as a continuous loop, which repeatedly checks the temporary mailbox to determine if a message has been stored there (step 460). If such a message has been located there, this message is then retrieved using the custom server interface, and transmitted to the other voice mail system (step 470). Finally, the DirectTalkMail application at the other voice mail system is responsible for receiving the transmitted voice message, and uses the custom server interface at that machine to add the voice message into the mailbox for the appropriate subscriber (not shown in FIG. 4).

In the preferred embodiment, the voice message is packaged as a normal piece of Internet mail, using the communications facilities provided by the underlying AIX operating system. In particular, the voice message is transmitted using the Voice Profile for Internet Mail (VPIM), see Internet rfc 1911 (currently available on the WorldWideWeb at http://www/cis/ohio-state.educ/htbin/rfc/rfc1911.html). Incidentally, it will be appreciated that such Internet transmission is performed much more easily with DirectTalkMail, given that it sits on top of a conventional, general purpose workstation with full communications support, than for many other voice mail systems which are based on special-purpose machines.

Thus the voice message is transferred from the voice mail system which received the call to the voice mail system which represents the ultimate destination of the message over communications link 350 using VPIM, which defines eg the message headers to be used, as well as the formats for actual message transmission. VPIM specifies that the audio information is encoded at 32 KBits per second using Adaptive Differential Pulse Code Modulation (ADPCM). CCITT Recommendation G.721 describes a technique for converting between ADPCM and A-law/mu-law, which is the format in which the audio information is supplied by the telephone network (A law is used in Europe, mu-law in the US and Japan). Note that VPIM permits proprietary formats to be used optionally used, provided ADPCM is supported. In the preferred embodiment shown in FIG. 3, both voice mail systems 330 and 340 are DirectTalkMail systems, and so the voice messages are transferred between machines using the standard DirectTalk compressed format.

It will be appreciated that the operations of FIG. 4 correspond in many ways to standard voice mail operations for receiving voice messages, with the addition of the test at step 430, and the message transmission facility 499. (Note that in some implementations the test at step 430 might not be explicitly performed. For example, the whole operation may be transparent to the main voice mail application, with the directory simply specifying a particular mailbox—the temporary one—for calls to certain subscribers, with the messages in this mailbox then being transmitted to the other voice mail system without any action or awareness on the part of the main voice mail application).

It will be recognised that the operations described above requires databases 335 and 345 to match, or at least contain information about subscribers on the other voice mail system. In the preferred embodiment, the two databases are indeed essentially copies (mirrors) of one another. Thus updates made to one of the databases, such as changing a greeting, or adding a new user, are transmitted across to the other database. Although this mirroring of databases could in theory be performed manually by a system administrator, the preferred embodiment utilises the automatic replication of databases which is well-known in the art.

There are many possible variations on the embodiment of FIG. 3. For example, the overall system 300 may contain more than two voice mail systems in order to increase capacity. Another option is that rather than having a database associated with each voice mail system, there might be a single separate database which both voice mail systems access over communications line 350 when required (typically when a call is received). Possibly this single database might reside on one of the voice mail systems, or perhaps be distributed across both voice mail systems. This approach avoids the need to replicate the database entries, but may increase access time, and hence overall response time. Another drawback with the use of a single database is that it does not provide the redundancy capability of the system shown in FIG. 3. On the other hand, if the overall system has more than two voice mail systems, then the redundancy capability is retained even if the overall system only has two copies of the database (ie without necessarily including a copy of the database with each voice mail system). Having the database on the same machine as the voice mail system generally helps scalability.

It will be appreciated that the system in FIG. 3 need not be attached to the telephone network via a PBX, but may have a more direct connection to the network. Also, this arrangement may be used either as customer premises equipment (CPE) or as service provider equipment (SPE).

Figure 5:
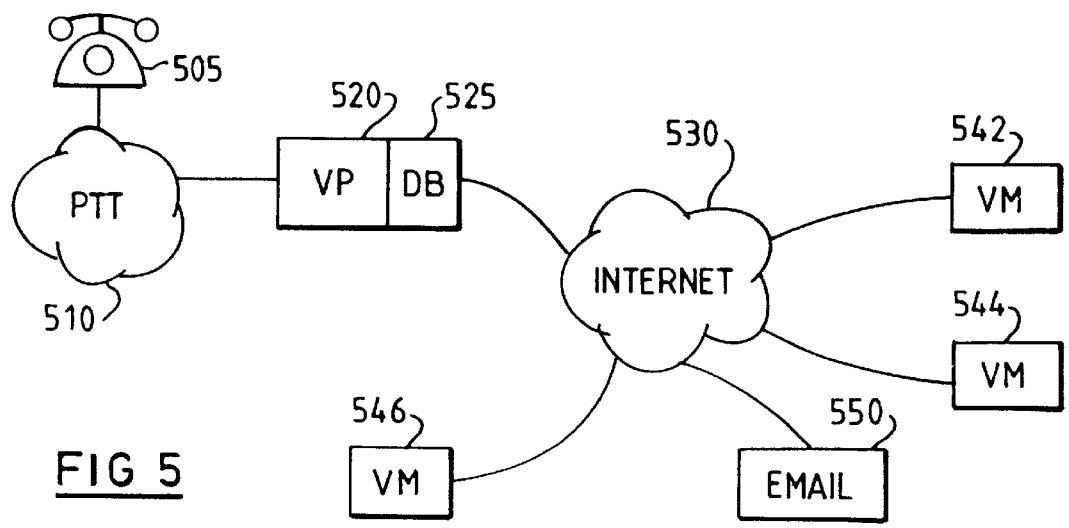
FIG. 5 is a schematic diagram of a second embodiment of the invention.

The arrangement illustrated in FIG. 3 is typically a close-coupled installation at a single location. FIG. 5 illustrates a second embodiment of the invention, generally appropriate for a more distributed environment, and representing the situation where a single telephone number is used to provide access to all the voice mail machines in a corporate network. This number might be an 800 (Freephone) number provided by the corporation to allows its employees to be contacted easily, for example by other employees or by customers. Alternatively, this service might be provided to the corporation by some third party service provider (possibly one of the telephone companies), in which case the access number might perhaps be a conventional number, or even a 900 (premium rate) number.

With reference to FIG. 5 therefore, the corporation has multiple voice mail systems 542, 544, and 546, which are all connected to the Internet 530. These voice mail systems may be located in different countries, and may have been supplied by different vendors. Also attached to the Internet is a voice processing system 520. Associated with the voice processing system is a database 525, which contains a directory of all the subscribers to the voice mail systems 542, 544 and 546.

In operation therefore, a call is received at the voice processing system 520 from a caller 505 over the telephone network 510. The voice processing system then interrogates the caller to determine the identity of the intended called party, for example, by asking for the telephone number or name, of the intended called party. Alternatively, in some circumstances the DNIS information may be sufficient to identify the intended recipient (for example, if the caller has dialled 800-ABC-XXXX, where ABC specifies the relevant corporation, and XXXX is specific to the intended call recipient). Yet another possibility is for a human operator to help collect the number of the called party.

The voice processing system then utilises the identity of the called party to access database 525. In the preferred embodiment, this directory contains the following information for each subscriber:

TABLE 1

| | |
|---|---|
| Phone/mailbox number: | 441962816369 |
| Name: | Davies, Simon R |
| Email address: | simon_davies@uk.ibm.com |
| Voice mail address: | 441962816369@dtmail.hursley.ibm.com |
| Send to email address: | No |
| Send to voice mail address: | Yes |
| Audioname: | <audio data> |

In the preferred embodiment, the mailbox number is the same as a subscriber's direct dial extension number (for an international call). The full voice mail address includes not only the mailbox number, but also the Internet (IP) address of the voice mail machine on which the mailbox resides. The "send to email/voice mail address" fields will be described in more detail below. The "audio name" is a recording of a subscriber speaking their own name.

Once the intended recipient of the caller has been identified, and the information listed in Table 1 has been retrieved, the voice processing system 520 can play the audio name to the caller, and invite them to leave a message for the subscriber in standard fashion. Assuming that they do so, the voice processing system 520 records the message, and the caller now disconnects.

The voice processing system then utilises the information listed in Table 1 to determine how to process the recorded message. Assuming that the "Send to voice mail address" flag is set (as shown in Table 1), the received recorded message is packaged in the VPIM format described above, and then transmitted over the Internet 530 to the voice mail system identified in Table 1 for that subscriber. The receiving voice mail system processes the incoming message (eg into the correct audio format, and stripping out the header information), and inserts the voice mail message into the appropriate mailbox for the identified subscriber, using the custom server interface of DirectTalk/6000 in the preferred embodiment. The subscriber can then access the voice mail message from their mailbox in conventional fashion.

The use of the Internet 530 to transmit messages to/from voice processing systems and/or voice mail systems is much more effective than transmission over the public telephone network as has hitherto been mainly performed. For example, the use of digital transmission allows data compression to be used, and moreover, the Internet may offer a much higher bandwidth than available on a telephone line. Furthermore, the use of computer messaging to transfer messages does not tie up one of the telephone ports of the voice processing or voice mail system, and so maximises availability of the system to callers.

Another advantage of the Internet is that it provides enhanced message transmission facilities compared to the conventional telephone network. For example, intermediate nodes in the Internet are responsible for storing and forwarding the message along an available route. Thus if the target voice mail system is temporarily unavailable, then the message will be queued in the Internet until the voice mail system becomes available again. Therefore, once the message has been dispatched into the Internet, the transmitting system need have no further involvement in its delivery to the target voice mail system. This is to be contrasted with the telephone network, where a direct end-to-end connection must be obtained. (Of course, one possibility is for a message to be retained at the sending voice processing system 520 until a formal acknowledgement is received from the target voice mail system, whereupon the message deleted from system 520. Re-transmission of the message may be attempted if the acknowledgement is not received within a predetermined time). Another facility of the Internet is that it is very straightforward to send a message to multiple addresses. Thus it is possible to implement systems in which the same message may be easily sent to multiple voice mailboxes.

Another advantage of the use of the Internet to route voice messages is that there is a universal addressing scheme, so that a given address is valid from anywhere in the world (thus the situation is even simpler than with telephones). Thus the system of FIG. 5 can use the Internet essentially transparently without requiring any knowledge of the network structure that is supporting the communications (eg which gateways to use, and so on). Note also that the Internet access is available essentially throughout the globe. It will further be recognised that exploiting the Internet infrastructure is a very cost-effective way of communicating between sites.

With reference to the "send to email address" field in Table 1, it will be noted that as depicted schematically by block 550 in FIG. 5, also attached to the Internet are various email addresses. It will be appreciated that these addresses may be located on very many different machines, having a wide geographical distribution. Directory 525 also lists the email addresses for each subscriber. In the preferred embodiment, a subscriber can specify whether their incoming voice messages should be directed to their voice mailbox, to their email address, or to both (see Table 1). If such messages are to be transmitted to their email address, either instead of or as well as to their voice mailbox, then this generally requires a separate Internet message to be sent to the relevant email address.

Thus in the preferred embodiment, if the "send to email address" flag is set, then voice processing system 520 packages the voice message as a piece of SMPT/MIME mail (SMTP="Simple Mail Tansfer Protocol", MIME= "Multipurpose Internet Mail Extensions"), conforming to Internet rfc 1521 "Mechanism for Specifying and Describing the Format of Internet Message Bodies". This standard is very well-known in the art. The result is that the audio file of the message is received at the email address of the subscriber. Most common personal computer mail programs, such as Lotus Notes, include software to allow such audio messages to be received and played out to the user (note that the ability to listen to voice mail messages at a workstation does require suitable audio hardware, unless some voice recognition facility is used, but multimedia machines with audio hardware are now very common).

Further, in the preferred embodiment, if a voice mail message is received and stored in a voice mail system 542, 544, or 546, then it can be accessed either over the conventional telephone network, or over the Internet 530 using a standard Web browser running on any computer workstation or other suitable platform. This is described in more detail in copending patent application PCT/GB95/02009. Again, suitable audio hardware is generally required to access such messages, although once more standard Web browsers, such as that from Netscape Corporation, already include the software to support this audio output. This aspect exploits the fact that a World Wide Web (WWW) front end is already widely available for all commercially significant platforms, being provided on all new machines for general access to the WWW, and so there is no need to develop or maintain specialised client software. Furthermore, users are already familiar with the WWW, so that very little additional training is required. Such an approach, together with directly sending a voice message to an email address, provides a subscriber with very quick and comprehensive access to voice mail messages.

It will be appreciated that the arrangement shown in FIG. 5 may be heterogeneous, in that the voice mail systems 542, 544, and 546 may all be from different vendors, and likewise, the email systems 550 may also be provided by different software packages on different platforms. It is a particular advantage of the invention that such heterogeneity may be supported, provided only that the voice mail/email systems support the relevant standards (rfc 1521 for email and rfc 1911 for voice mail). This allows subscribers to use any desired voice mail/email system, and is especially beneficial for example, when the voice processing system 520 is being operated by a service provider as a service to multiple independent customers, all of whom may have their own, distinct voice mail/email solution. Typically, such subscribers may be able to register with the service provider by completing a simple form available on the Internet (WorldWideWeb), paying the registration fee, and recording their audio name. Their details would then be added to the database directories at the next appropriate update.

Again, the skilled person will realise that many modifications and variations are possible on the system shown in FIG. 5. For example, instead of connecting the machines via the Internet, an intranet may be used. An intranet is generally similar to the Internet, using the same protocols (ie MIME/SMTP, and VPIM etc), and offers most of the advantages discussed above with reference to the Internet, but is limited in scope, typically to a single company. Another possibility is for voice processing system 520 itself to be a voice mail system, analogous to the situation described with reference to FIG. 3, storing received voice messages locally for subscribers whose mailboxes are located on that machine. It will also be appreciated that the approach shown in FIG. 5 could be adopted either for CPE (eg behind a PBX), or for SPE (eg attached to a central office).

As shown, the system in FIG. 5 does not have redundancy. This can easily be included by duplicating the voice processing system 520. In this situation, the database would also typically be duplicated for the second voice processing system. The situation would again then be somewhat analogous to FIG. 3, in that incoming calls would be routed to an available or preferred voice processing system. Of course, in some situations there may be multiple voice processing systems to provide sufficient call handling capability. As discussed with reference to FIG. 3, there are a wide range of possibilities for how and where the database (and any copies) might be maintained if two or more voice processing systems are utilised.

The use of multiple redundant voice processing systems can provide a system with extremely high availability, since at least one such voice processing system should always be available to receive incoming calls. Moreover, even if a subscriber's voice mail or email system is down at the time of receipt of the call, the forwarded message will be retained in the Internet until the system becomes available again. Thus such a system may give the external appearance of a single voice mail system with extremely high availability, especially in terms of receiving and recording messages.

In the prior art, high availability has been based on the assumption that this requires the subscriber's mailbox to he highly available. However, the presenr invention separates out the message receipt function from the message storage function, thereby providing a cheaper, more robust solution. Note that whilst unavailability subscriber's voice mail system does prevent retrieval of the messages stored therein, this problem can be overcome by sending the voice message not only to the subscriber's voice mail address, but also to their email address. Alternatively (or aadditionally), access to the subscriber's voice mail machine can be further protected by high availability options.

In the preferred embodiment, there is a separate voice processing system entry point/gateway into the voice mail network for each country (in other words, separate PTT networks 505 and voice processing systems 520 exist for each country of interest to the owner of voice mail systems 542, 544, 546, with each having their own connection to the Internet). This allows callers to access voice mail systems 542, 544, 546 without having to make an international call, irrespective of the country in which they or the relevant voice mail system is located. Indeed there may be multiple voice processing systems acting as gateways to the Internet 530 and voice mail systems 542, 544 and 546 distributed even within one country, again possibly to reduce tariff costs (eg to allow the voice processing system to be reached with a local rather than long-distance call).

It will be appreciated that hitherto the prior art has only permitted actual subscribers logged onto the voice mail system (typically with password protection) to send international or inter-vendor voice messages. However, the system of FIG. 5 now provides this facility to all callers who reach voice processing system 520.

As multiple distributed voice processing systems are utilised, then the task of maintaining equivalent database directories at all locations requires somewhat greater coordination. In the preferred embodiment there is a centralised data-base attached to the Internet. Whenever a voice mail system 542, 544 or 546 is updated, then a copy of this update is sent to this central directory. These updates are then collected, and overnight distributed to all of the databases utilised by the receiving voice processing systems, where a corresponding update is applied to each database. Clearly an alternative approach would be for each voice mail system to notify every database directly of any updates to the directory. This would reduce overall efficiency, but provide improved response times.

In order to reduce the size of the directory, the recording of the audio name may be omitted. In these circumstances, the voice processing system may simply play a standard message to all callers (eg "The person you have called is not currently available"). Alternatively, it may perform text-to-speech conversion on the subscriber name (as described for example in the manual IBM AIX DirectTalk/6000 Text-to-Speech, publication number SC33-1735).

Conversely, if directory size is not a problem, a recording of a personalised greeting may also be stored along with the audio name. This may for example indicate the current location of the subscriber, plus an estimate of call-back time. Note that in changing their personalised greeting, a subscriber should be aware of the frequency with which the directory is updated. For example, if the databases are only updated on a daily basis, then it would be sensible to update a greeting to indicate that the subscriber is away on vacation for two weeks, but not to update a greeting simply to indicate that the subscriber is in a meeting that afternoon.

I claim:

1. A voice processing system for connection to a public telephone network and having a digital communications link to two or more voice mail systems, each supporting a plurality of subscriber voice mailboxes, and wherein no subscriber mailboxes are stored on said voice processing system, said system including:
   means for receiving over the public telephone network a voice message for a subscriber to one of said two or more voice mail systems, said voice message being from a caller who is not necessarily a subscriber to any of said two or more voice mail systems;
   means for determining the voice mail system on which said subscriber has a voice mailbox by accessing a directory listing substantially all the subscribers who have a voice mailbox on said two or more voice mail systems;
   means for temporarily storing the received voice message; and
   means, responsive to said determination, for transmitting in digital format the stored voice message to the voice mail system on which said subscriber has a voice mailbox.

2. The system of claim 1, wherein said directory includes for each subscriber an identification of their voice mailbox and the voice mail system on which said voice mailbox is located.

3. The system of claim 2, wherein said directory includes a personalised recording for at least some subscribers to said two or more voice mail systems, and said system includes means for playing said recording to the sender of said voice message.

4. The system of claim 3, wherein said personalised recording comprises the name of said subscriber, spoken by said subscriber.

5. The system of claim 2, wherein said directory includes for at least some subscribers the name of the subscriber, and wherein said system includes text to speech conversion means for playing said name to the sender of said voice message.

6. The system of claim 1, wherein said directory includes for at least some subscribers the electronic mail address of the subscriber, and said system further includes means for transmitting the voice message to said electronic mail address.

7. The system of claim 6, wherein said voice message is transmitted to said electronic mail address as an audio file.

8. The system of claim 7, wherein said audio file is in Internet SMTP/MIME format.

9. The system of claim 6, wherein a subscriber may optionally select whether received voice messages are transmitted to his/her voice mailbox, or to his/her electronic mail address, or to both.

10. The system of claim 1, wherein said directory is included on the same machine as said voice processing system.

11. The system of claim 1, wherein said communications link is over a multi-node network providing robust message delivery.

12. The system of claim 11, wherein said robust message delivery includes storage within the network of a voice message being transmitted from said voice processing system to a voice mail system if said voice mail system is unavailable.

13. The system of claim 11 or 12, wherein said communications link comprises the Internet.

14. The system of claim 11 or 12, wherein said communications link comprises a computer intranet.

15. A method of providing a voice mail service using a voice processing system connected to a public telephone network and having a digital communications link to two or more voice mail systems, each supporting a plurality of subscriber voice mailboxes, and wherein no subscriber mailboxes are stored on said voice processing system, said method including the steps of:
   receiving a voice message over the public telephone network for a subscriber to one of said two or more voice mail systems at said voice processing system, said voice message being from a caller who is not necessarily a subscriber to any of said two or more voice mail systems;
   determining the voice mail system on which said subscriber has a voice mailbox by accessing a directory listing substantially all the subscribers who have a voice mailbox on said two or more voice mail systems;
   temporarily storing the received voice message on said voice processing system; and
   transmitting in digital format the stored voice message to the voice mail system on which said subscriber has a voice mailbox.

16. The method of claim 15, wherein said directory includes for each subscriber an identification of their voice mailbox and the voice mail system on which said voice mailbox is located.

17. The method of claim 16, wherein said directory includes a personalised recording for at least some subscribers to said two or more voice mail systems, and said method includes playing said recording to the sender of said voice message.

18. The method of claim 17, wherein said personalised recording comprises the name of said subscriber, spoken by said subscriber.

19. The method of claim 16, wherein said directory includes for at least some subscribers the name of the subscriber, and wherein said method includes performing text to speech conversion for playing said name to the sender of said voice message.

20. The method of claim 15, wherein said directory includes for at least some subscribers the electronic mail address of the subscriber, and said method further includes transmitting the voice message to said electronic mail address.

21. The method of claim 20, wherein said voice message is transmitted to said electronic mail address as an audio file.

22. The method of claim 21, wherein said audio file is in Internet SMTP/MIME format.

23. The method of claim 20, wherein a subscriber may optionally select whether received voice messages are transmitted to his/her voice mailbox, or to his/her electronic mail address, or to both.

24. The method of claim 15, further comprising the step of propagating information about updates to said one or more voice mail systems to said directory.

25. The method of claim 15, further comprising the steps of providing at least two copies of said directory to ensure a redundancy capability.

26. The method of claim 15, wherein said communications link is over a multi-node network providing robust message delivery.

27. The method of claim 26, wherein said robust message delivery includes storing within the network a voice message being transmitted from said voice processing system to a voice mail system if said voice mail system is unavailable.

28. The method of claim 26 or 27, wherein said communications link comprises the Internet.

29. The method of claim 26 or 27, wherein said communications link comprises a computer intranet.

30. The method of claim 15, wherein said voice processing system is located in a different country from at least one of said at least one or more voice mail systems.

31. The method of claim 15, wherein there are at least two voice processing systems, and said voice message for a subscriber to said two or more voice mail systems may be received at any one of said at least two voice processing systems.

32. The method of claim 31, wherein said at least two voice processing systems may perform said determining and transmitting steps independently of one another to provide a redundancy capability.

33. The method of claim 32, wherein said at least two voice processing system may be reached by dialling the same telephone number.

34. The method of claim 33, wherein calls for a particular subscriber are preferentially received by one of said at least two voice processing systems.

35. A method of providing a voice mail service using at least two voice processing systems, each voice processing system comprising a voice mail system including subscriber mailboxes and having a communications link to one or more voice mail systems, said method including the steps of:

receiving a voice message for a subscriber to said one or more voice mail systems at any one of said voice processing systems, wherein calls for a particular subscriber having a mailbox on one of said at least two voice processing systems are preferentially received by the voice processing system on which the mailbox is located;

determining the voice mail system on which said subscriber has a voice mailbox; and transmitting the voice message to the voice mail system on which said subscriber has a voice mailbox.

36. A system for providing voice mail service comprising at least two voice processing systems, each connected to a public telephone network and having associated therewith a database containing a directory of subscribers to said voice mail service, and at least two voice mail systems for storing voice mailboxes for subscribers to said voice mail service, said at least two voice processing systems and said at least two voice mail systems being connected together by a disital communications link, wherein no subscriber mailboxes are stored on said voice processing systems, said system including:

means for routing an incoming call for a subscriber received over the public telephone network to a selected one of said voice processing systems, said call being from a caller who is not necessarily a subscriber to any of said two or more voice mail systems, means at said selected voice processing system for receiving a voice message for a subscriber to said voice mail service;

means at said selected voice processing system for using said associated directory to determine the voice mail system on which said subscriber has a voice mailbox;

means, responsive to said determination, for transmitting the voice message in digital format over said communications link to the voice mail system on which said subscriber has a voice mailbox.

37. The system of claim 36, wherein voice mailboxes in at least one of said at least one voice mail systems may be accessed over the Internet by a WorldWideWeb browser.

38. The system of claim 36, wherein said at least two voice processing systems have a digital trunk connection to the public telephone network.

* * * * *